(No Model.)
H. GAMBLE.
NUT LOCK.
No. 391,410. Patented Oct. 23, 1888.
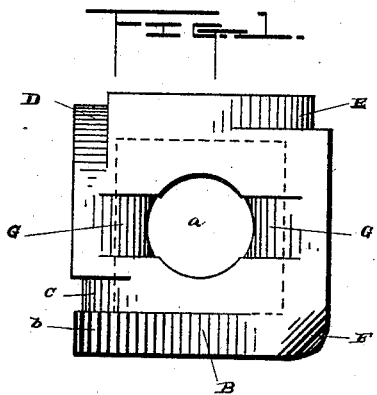
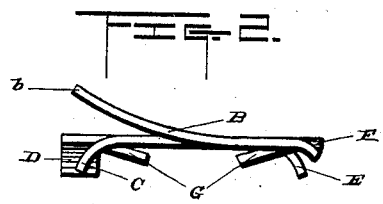
Witnesses,
R. B. Seward.
Benj. G. Cowl.
Inventor,
Howard Gamble
By James G. Young &
E. B. Seward,
Attorneys.

UNITED STATES PATENT OFFICE.

HOWARD GAMBLE, OF LANSING, KANSAS.

NUT-LOCK.

SPECIFICATION forming part of Letters Patent No. 391,410, dated October 23, 1888.

Application filed May 21, 1888. Serial No. 274,604. (No model.)

*To all whom it may concern:*

Be it known that I, HOWARD GAMBLE, a citizen of the United States, residing at Lansing, in the county of Leavenworth and State of Kansas, have invented certain new and useful Improvements in Nut-Lock Washers; and I do hereby declare the following to be a full, clear, and exact description of the invention, such as will enable others skilled in the art to which it appertains to make and use the same.

My invention relates to an improvement in nut-lock washers.

The object is to provide a washer which may be stamped from a sheet of spring metal, and which shall be particularly well adapted to the purpose of locking a nut on a bolt in connection with wood-work and effectually preventing rattling by taking up the wear as the wood shrinks.

With these ends in view my invention consists in certain features of construction and combinations of parts, as will be hereinafter described, and pointed out in the claim.

In the accompanying drawings, Figure 1 is a top plan view of a washer embodying my invention, the position of the nut being shown in dotted lines; and Fig. 2 is a view of the same in side elevation.

A represents the body portion of the washer, which is formed of thin metal plate—spring-steel, for example. One side of the plate is slit, forming a narrow tongue or arm, B, which has a normal position gradually rising from where it joins the body of the plate toward its free end $b$. As the nut (represented by dotted lines) is turned on, the corners of the nut slide over the gradually-rising arm B, and when the side of the nut reaches a position with its side nearly or quite in line with the arm the raised edge of the arm will abut against the side of the nut and prevent it from turning off. Three corners of the washer are slit, forming the three short downwardly-turned arms or lugs, C, D, and E, and the fourth corner, F, of the washer is turned down, thus forming four points or lugs adapted to enter the wood, against which the washer is placed, and thereby hold it firmly against a rotary movement.

In order to provide against loosening by shrinkage of the wood, the central portion of the body A, on opposite sides of the bolt-hole $a$, is provided with slits, forming the broad downwardly-projected tongues G, which, when the nut is screwed home on the bolt, are sprung up into the plane of the body A, but which will, as the wood shrinks, press the washer outwardly against the nut and prevent rattling.

It is obvious that slight changes might be resorted to without departing from the spirit and scope of my invention; hence I do not wish to limit myself strictly to the form and construction herein set forth; but,

Having thus fully described my invention, what I claim as new, and desire to secure by Letters Patent, is—

As an article of manufacture, a nut-lock washer struck out from a single piece of metal, and consisting of a flat spring-metal portion pierced centrally with a bolt-hole and having a raised strip along one edge partially separated therefrom, three of its corners slit and depressed, its fourth corner turned down for the purpose of locking the washer in place, and the central portion slit on the opposite sides of the bolt-hole to form broad tongues, which are normally depressed, and which prevent the washer from rattling, substantially as set forth.

In testimony whereof I have affixed my signature in presence of two witnesses.

HOWARD GAMBLE.

Witnesses:
R. L. GREEN,
JNO. CAMPBELL.